United States Patent
Vesterinen et al.

(10) Patent No.: US 11,026,247 B2
(45) Date of Patent: Jun. 1, 2021

(54) TRANSMITTING DATA BASED ON FLOW INPUT FROM BASE STATION

(71) Applicant: Nokia Solutions and Networks Oy, Espoo (FI)

(72) Inventors: Seppo Ilmari Vesterinen, Oulunsalo (FI); Matti Einari Laitila, Oulu (FI); Marko Pentti Mikael Saarinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 15/512,051

(22) PCT Filed: Sep. 23, 2014

(86) PCT No.: PCT/EP2014/070234
§ 371 (c)(1),
(2) Date: Mar. 16, 2017

(87) PCT Pub. No.: WO2016/045702
PCT Pub. Date: Mar. 31, 2016

(65) Prior Publication Data
US 2017/0280474 A1    Sep. 28, 2017

(51) Int. Cl.
*H04W 72/12* (2009.01)
*H04L 29/08* (2006.01)
(Continued)

(52) U.S. Cl.
CPC ......... *H04W 72/1257* (2013.01); *H04L 41/50* (2013.01); *H04L 67/32* (2013.01);
(Continued)

(58) Field of Classification Search
CPC .. H04W 72/1257; H04W 88/08; H04L 41/50; H04L 67/32
See application file for complete search history.

(56) References Cited

U.S. PATENT DOCUMENTS

| 9,843,964 B2 * | 12/2017 | Franklin | H04W 28/22 |
| 2005/0014509 A1 * | 1/2005 | Semper | H04W 28/24 |
| | | | 455/452.2 |

(Continued)

FOREIGN PATENT DOCUMENTS

| EP | 2580893 A1 | 4/2013 |
| WO | 2016/045690 A1 | 3/2016 |

OTHER PUBLICATIONS

International Search Report and Written Opinion received for corresponding Patent Cooperation Treaty Application No. PCT/EP2014/070234 dated Jun. 17, 2015, 10 pages.

(Continued)

*Primary Examiner* — Walli Z Butt
*Assistant Examiner* — Thad N Defauw
(74) *Attorney, Agent, or Firm* — Brake Hughes Bellermann LLP

(57) ABSTRACT

According to an example embodiment, A method may include scheduling, by a base station, uplink wireless resources for a user device, receiving, from the user device via the scheduled wireless resources, data associated with at least a first application and a second application, monitoring whether the user device is meeting a first quality of service policy associated with the first application based on the received data associated with the first application, monitoring whether the user device is meeting a second quality of service policy associated with the second application based on the received data associated with the second application, and instructing the user device to adjust an uplink data rate of an application flow associated with the first application based on the monitoring whether the user device is meeting the quality of service policy for the first application.

20 Claims, 9 Drawing Sheets

(51) Int. Cl.
  *H04L 12/24* (2006.01)
  *H04W 28/22* (2009.01)
  *H04W 88/02* (2009.01)
  *H04W 88/08* (2009.01)

(52) U.S. Cl.
  CPC ............ *H04W 28/22* (2013.01); *H04W 88/02* (2013.01); *H04W 88/08* (2013.01)

(56) References Cited

U.S. PATENT DOCUMENTS

| | | | | |
|---|---|---|---|---|
| 2007/0032200 | A1* | 2/2007 | Taneja | H04L 1/0002 455/70 |
| 2007/0243879 | A1* | 10/2007 | Park | H04L 41/0806 455/453 |
| 2009/0300209 | A1* | 12/2009 | Elzur | H04L 47/10 709/234 |
| 2010/0098047 | A1* | 4/2010 | Zhou | H04L 47/10 370/345 |
| 2010/0248643 | A1* | 9/2010 | Aaron | H04L 1/0002 455/68 |
| 2010/0284314 | A1* | 11/2010 | Pelletier | H04L 47/30 370/310 |
| 2011/0044168 | A1* | 2/2011 | N Das | H04L 1/0002 370/232 |
| 2011/0305240 | A1* | 12/2011 | Chu | H04L 47/245 370/391 |
| 2014/0192638 | A1* | 7/2014 | Taneja | H04W 28/0268 370/229 |
| 2014/0335877 | A1* | 11/2014 | Roberts | H04W 28/16 455/452.1 |
| 2014/0348073 | A1* | 11/2014 | Elhaddad | H04L 47/52 370/329 |
| 2014/0349633 | A1* | 11/2014 | Sajadieh | H04W 8/18 455/418 |
| 2015/0146637 | A1* | 5/2015 | Morita | H04W 72/1252 370/329 |
| 2015/0256463 | A1* | 9/2015 | Nanda | H04L 1/0002 370/230.1 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 12)", 3GPP TS 36.321, V12.1.0, Mar. 2014, pp. 1-57.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V12.1.0, Mar. 2014, pp. 1-209.

"LTE Identification III: EPS Session/Bearer Identifiers", Netmanias, Retrieved on Apr. 13, 2017, Webpage available at http://www.netmanias.com/en/?m=view&id=techdocs&no=5907.

"Multilayer Switch", Wikipedia, Retrieved on Mar. 22, 2017, Webpage available at : https://en.wikipedia.org/wiki/Multilayer_switch.

Office Action for European Application No. 14772132.8, dated Dec. 10, 2018, 6 pages.

Office Action for European Application No. 14772132.8, dated Feb. 26, 2020, 5 pages.

* cited by examiner

TRANSMITTING DATA BASED ON FLOW INPUT FROM BASE STATION

RELATED APPLICATION

This application was originally filed as Patent Cooperation Treaty Application No. PCT/EP2014/070234 filed Sep. 23, 2014.

TECHNICAL FIELD

This description relates to wireless networking.

BACKGROUND

Different applications may have different quality of service (QoS) and/or quality of experience (QoE) requirements, such as bandwidth or data rate and latency. User devices and the network may be unable to meet the QoE requirements of the numerous concurrent applications with the uplink communication resources, such as uplink wireless resources, granted by a base station.

SUMMARY

According to an example embodiment, A method may include scheduling, by a base station, uplink wireless resources for a user device, receiving, from the user device via the scheduled wireless resources, data associated with at least a first application and a second application, monitoring whether the user device is meeting a first quality of service policy associated with the first application based on the received data associated with the first application, monitoring whether the user device is meeting a second quality of service policy associated with the second application based on the received data associated with the second application, and instructing the user device to adjust an uplink data rate of an application flow associated with the first application based on the monitoring whether the user device is meeting the quality of service policy for the first application.

According to another example embodiment, a non-transitory computer-readable storage medium comprising instructions stored thereon that, when executed by at least one processor, are configured to cause a base station to schedule uplink wireless resources for a user device, receive, from the user device via the scheduled wireless resources, data associated with at least a first application and a second application, monitor whether the user device is meeting a first quality of service policy associated with the first application based on the received data associated with the first application, monitor whether the user device is meeting a second quality of service policy associated with the second application based on the received data associated with the second application, and instruct the user device to adjust an uplink data rate of an application flow associated with the first application based on the monitoring whether the user device is meeting the quality of service policy for the first application.

According to another example embodiment, a base station may include at least one processor configured to execute instructions, at least one wireless interface configured to send and receive data, and a non-transitory computer-readable storage medium comprising instructions stored thereon. When executed by the at least one processor, the instructions may be configured to cause the base station to schedule uplink wireless resources for a user device, receive, from the user device via the scheduled wireless resources, data associated with at least a first application and a second application, monitor whether the user device is meeting a first quality of service policy associated with the first application based on the received data associated with the first application, monitor whether the user device is meeting a second quality of service policy associated with the second application based on the received data associated with the second application, and instruct the user device to adjust an uplink data rate of an application flow associated with the first application based on the monitoring whether the user device is meeting the quality of service policy for the first application.

According to another example embodiment, a base station may include means for scheduling uplink wireless resources for a user device, means for receiving, from the user device via the scheduled wireless resources, data associated with at least a first application and a second application, means for monitoring whether the user device is meeting a first quality of service policy associated with the first application based on the received data associated with the first application, means for monitoring whether the user device is meeting a second quality of service policy associated with the second application based on the received data associated with the second application, and means for instructing the user device to adjust an uplink data rate of an application flow associated with the first application based on the monitoring whether the user device is meeting the quality of service policy for the first application.

According to another example embodiment, a method may include maintaining, by a user device, at least a first buffer and a second buffer, the first buffer being shared by a first group of service flows with similar quality of service requirements and the second buffer being shared by a second group of service flows with similar quality of service requirements, sending at least one buffer signal to a base station, the at least one buffer signal indicating a level of fullness of the first buffer and a level of fullness of the second buffer, receiving a quality of service instruction signal from the base station, the quality of service instruction signal instructing the user device to adjust a data rate of the first group of service flows, and determining which of the first buffer and the second buffer from which to send packets to the base station based on quality of service requirements of the first group of service flows, the quality of service requirements of the second group of service flows, and the quality of service instruction signal from the base station.

According to another example embodiment, a non-transitory computer-readable storage medium comprising instructions stored thereon that, when executed by at least one processor, are configured to cause a user device to maintain at least a first buffer and a second buffer, the first buffer being shared by a first group of service flows with similar quality of service requirements and the second buffer being shared by a second group of service flows with similar quality of service requirements, send at least one buffer signal to a base station, the at least one buffer signal indicating a level of fullness of the first buffer and a level of fullness of the second buffer, receive a quality of service instruction signal from the base station, the quality of service instruction signal instructing the user device to adjust a data rate of the first group of service flows, and determine which of the first buffer and the second buffer from which to send packets to the base station based on quality of service requirements of the first group of service flows, the quality of service requirements of the second group of service flows, and the quality of service instruction signal from the base station.

According to another example embodiment, a user device may include at least one processor configured to execute instructions, at least one wireless interface configured to send and receive data, and a non-transitory computer-readable storage medium comprising instructions stored thereon. When executed by the at least one processor, the instructions may be configured to cause the user device to maintain at least a first buffer and a second buffer, the first buffer being shared by a first group of service flows with similar quality of service requirements and the second buffer being shared by a second group of service flows with similar quality of service requirements, send at least one buffer signal to a base station, the at least one buffer signal indicating a level of fullness of the first buffer and a level of fullness of the second buffer, receive a quality of service instruction signal from the base station, the quality of service instruction signal instructing the user device to adjust a data rate of the first group of service flows, and determine which of the first buffer and the second buffer from which to send packets to the base station based on quality of service requirements of the first group of service flows, the quality of service requirements of the second group of service flows, and the quality of service instruction signal from the base station.

According to another example embodiment, a user device may include means for maintaining at least a first buffer and a second buffer, the first buffer being shared by a first group of service flows with similar quality of service requirements and the second buffer being shared by a second group of service flows with similar quality of service requirements, means for sending at least one buffer signal to a base station, the at least one buffer signal indicating a level of fullness of the first buffer and a level of fullness of the second buffer, means for receiving a quality of service instruction signal from the base station, the quality of service instruction signal instructing the user device to adjust a data rate of the first group of service flows, and means for determining which of the first buffer and the second buffer from which to send packets to the base station based on quality of service requirements of the first group of service flows, the quality of service requirements of the second group of service flows, and the quality of service instruction signal from the base station.

The details of one or more implementations are set forth in the accompanying drawings and the description below. Other features will be apparent from the description and drawings, and from the claims.

DETAILED DESCRIPTION

Figure 1:
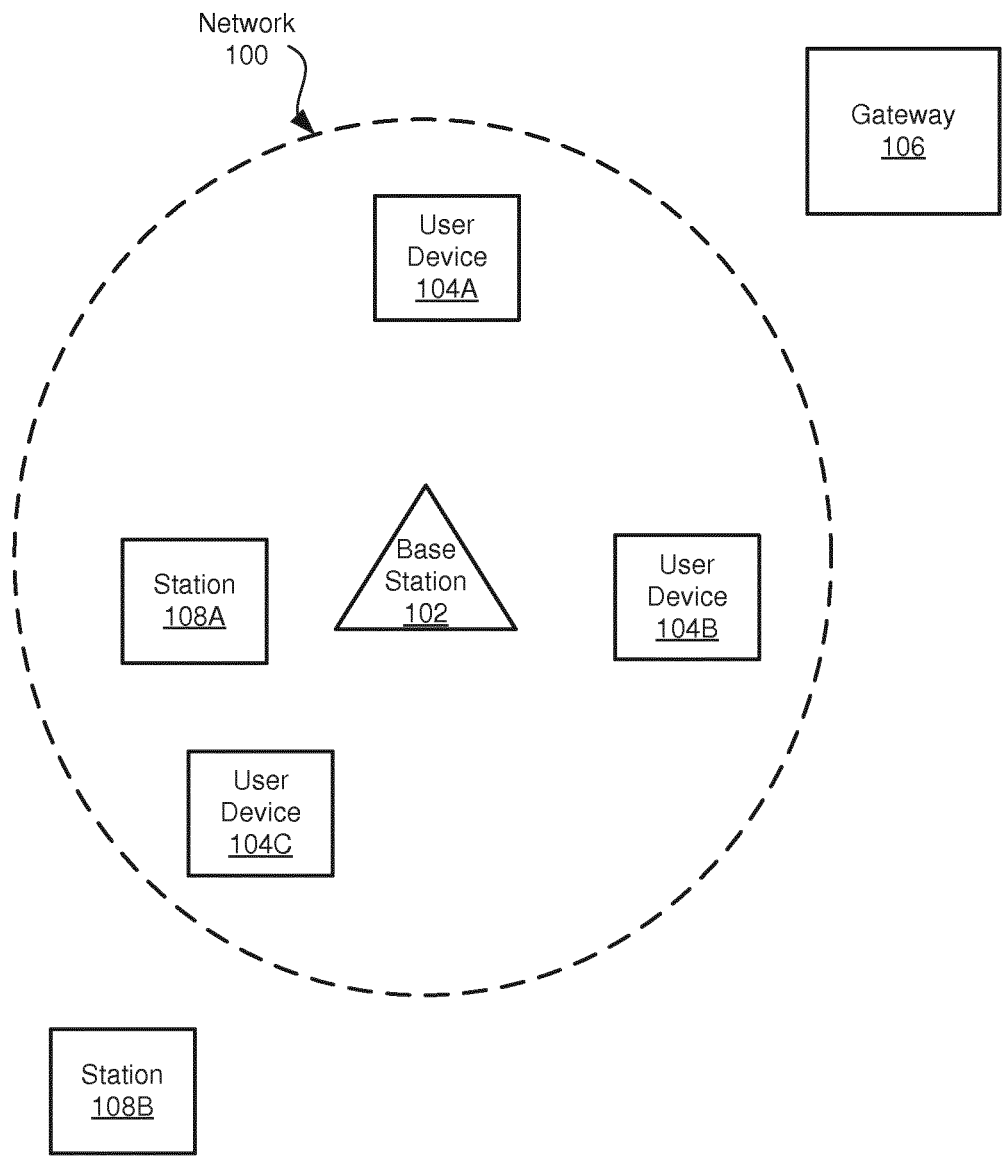
FIG. 1 is a diagram of a network according to an example embodiment.

A base station in a fifth generation wireless mobile system (5G) or other wireless communication system or network may monitor and/or determine whether user devices and the network are meeting Quality of Experience (QoE) requirements for numerous concurrent application flows and/or service flows with different Classes of Service (CoS) based on monitoring the uplink data transmissions, and/or buffer status reports, that the base station receives from the user devices. The base station may monitor whether the user device and/or the network are meeting a first quality of service (QoS) policy associated with a first application, first application type (which may include one or more similar applications), and/or first class of service (CoS), whether the user device and/or the network are meeting a second QoS policy associated with a second application, second application type, and/or second CoS, or any number of QoS policies, applications, application types, or CoSs. An application type may include applications with similar purposes and/or functions, such as voice (e.g. Voice over Internet Protocol/VoIP) applications, video applications, text applications, or data applications. The user device(s) may insert into packets identifiers of the application, application type, and/or CoS associated with the packets, and/or the packets may include identifiers of the application, application type, and/or CoS associated with the packets.

The base station may monitor whether the user device and/or network are meeting QoS policies for applications, application types, and/or CoSs based on average packet sizes of received data associated with the respective applications, application types, and/or CoSs, based on average frequencies of receiving packets of received data associated with the respective applications, application types, and/or CoSs, based on comparing times of receipt of packets associated with the respective applications, application types, and/or CoSs to QoS requirements for the respective applications, application types, and/or CoSs, based on determining a data rate for the respective applications, application types, and/or CoSs based on receiving packets associated with and/or identifying the respective applications, application types, and/or CoSs, based on determining latencies for the respective applications, application types, and/or CoSs, and/or based on determining latencies of service for the respective applications, application types, and/or CoSs. By monitoring and/or determining dynamically in the base station whether the QoS requirements and/or QoS policies of individual application and/or service flows are met based on the uplink data transmissions and/or buffer status reports and QoS policies, rather than handling the QoS with help of bearer services that are associated to few QoS Classes and are managed in control of the core network, the related bearer and session management signaling between the core network, base station and the user devices within the network may be reduced. This reduction in bearer/session management signaling may allow additional communication resources to be assigned and/or scheduled for data communication in the network.

The base station may communicate with each of the user devices via a single Ethernet-like link layer point-to-point connection, which may be wireless, with variable data capacity, per user device. The base station may establish and maintain a single adaptive connection with each of the user devices within the wireless network, increasing and decreasing the uplink data communication resources and/or uplink wireless resources for each user device within the adaptive connection, rather than maintain multiple dedicated radio bearers per CoS with each user device. The communication resources may include time slots and/or frequency slots or bands via which the user devices send data to the base station. The user devices may each prioritize the uplink traffic according to a set of its configured QoS policy data to identify the individual and concurrent application and/or service flows in uplink at the upper protocol layers (L3 and above) and map these to multiple priority queues at the data link and physical layers of the radio link connection (L2 and L1), such as two or more or four queues, each being associated with a different application, application type, CoS, service flow, and/or application flow and having different QoS requirements. The base station may perform predictive uplink radio scheduling based on uplink buffer status reports received from the user devices in a fast control loop, assigning more uplink data communication resources to user devices with large amounts of data in their queues and/or more full queues and less uplink data communication resources to user devices with lower amounts of data in their queues and/or less full queues.

The base station may also be configured with QoS policy data to identify the individual and concurrent application and/or service flows at the upper protocol layers (L3 and above) in order to provide a dynamic uplink flow control for the user devices based on the application and/or service flow aware monitoring in a slow control loop, in which the base station monitors and/or determines whether the user devices are meeting the QoS requirements for their services flows and/or CoSs based on the user devices' uplink data transmissions. This flow control function in the base station may also be capable to adjust dynamically the uplink data rate control function in the user equipment with accuracy of an individual application flow and/or service flow at the upper protocol layers. The base station may instruct the user device to adjust an uplink data rate of an application flow and/or service flow by instructing the user device to adjust the uplink data rate of the application flow at an upper application protocol layer associated with the application, application type, and/or CoS based on the monitoring whether the user device and/or network is meeting the QoS policy for the application, application type, and/or CoS.

A service flow and/or application flow adjusted by the base station (and/or a service flow and/or application flow for which the base station instructs the user device to adjust the uplink data rate) may be identified by traffic flow template (TFT) filtering rules. The base station may monitor whether the user device is meeting quality of service policies associated with applications, application types, and/or CoSs by monitoring data received via application protocol layer flows associated with the applications, application types, and/or CoSs. The base station may determine whether and/or which application protocol layer a packet and/or data is associated with based on a TFT. The base station may also perform admission control by monitoring the current network load including data still to be sent based on the uplink buffer status reports to determine whether sufficient communication resources are available to admit new user devices. Switching functions in the base station and user devices may enable port-based forwarding, virtual local area network (VLAN) tagging, and/or TFT filtering rules.

The TFT filtering rules may be based on and/or match fields including source address (which may include a subnet mask), Internet Protocol protocol number (such as Transmission Control Protocol (TCP) or Uniform Datagram Protocol (UDP)), destination port range, source port range, Internet Protocol Security (IPSec) Security Parameter Index (SPI), Type of Service (TOS) (for IPv4), Flow-Label (for IPv6), source Ethernet Medium Access Control (MAC) address, Ether-type number (such as a protocol carried in the Ethernet frame including IPv6 or IPv4), CoS, and/or VLAN identifier. The TFT may be a classifier that matches fields on packets (such as IP packets and/or Ethernet frames) generated and/or sent by the user device, and/or received by the base station. The user device may include an internal packet data router function, and/or an internal multilayer switch function that supports port-based forwarding, that performs flow detection, such as IP flow detection and/or Ethernet flow detection, based on TFTs configured in the user device, and routes matching uplink packets to multiple, such as four, queues and/or buffers in the user device. The multiple queues and/or buffers that store packets based on the TFTs may be considered transmission buffers with different priority levels. The user device may transmit the packets stored in the queues and/or buffers to the base station via the scheduled uplink wireless resources.

The user devices, which may also be referred to as user equipments (UEs), may be connected (and in communication) with the base station, which may also be referred to as an enhanced Node B (eNB). At least part of the functionalities of a base station or (e)Node B may be also be carried out by any node, server or host which may be operably coupled to a transceiver, such as a remote radio head. The base station may provide wireless coverage within a cell or wireless network, including to the user devices. The base station may also be connected to a core network via an interface such as an S1 interface and/or base station controller. This is merely one example of a wireless network, and others may be used.

A user device (user terminal, user equipment (UE)) may refer to a portable computing device that includes wireless mobile communication devices operating with or without a subscriber identification module (SIM), including, but not limited to, a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, or a multimedia device, as examples. A user device may also be a nearly exclusive uplink only device, of which an example is a camera or video camera loading images or video clips to a network.

FIG. 1 is a diagram of a network 100 according to an example embodiment. The network 100 may include a wireless network, such as a wireless infrastructure network. The network 100 may include a wireless infrastructure network in which a base station 102 communicates with, and assigns communication resources to, multiple user devices 104A, 104B, 104C. The network 100 may include a cellular network, such as a fifth generation wireless mobile system (5G) network or a Long-Term Evolution (LTE) or LTE-Advanced network. While three user devices 104A, 104B, 104C are shown in FIG. 1, any number of user devices 104A, 104B, 104C may be included in the network 100. The base station 102 may forward data between the user devices 104A, 104B, 104C and a User-plane Gateway 106, base station controller, mobile switching center, gateway, and/or other upstream nodes in a packet network.

The user devices 104A, 104B, 104C may generate and send data in an uplink direction to the base station 102 in a form of packets using uplink data communication resources and/or uplink wireless resources that the base station 102 assigned to and/or scheduled for the respective user device 104A, 104B, 104C. The data may originate from applications running on the user devices 104A, 104B, 104C, and/or may originate from wireless nodes 108A, 108B in communication with one of the user devices 104C. The base station 102 may also send data in a downlink direction to the user devices 104A, 104B, 104C. The base station 102 and user devices 104A, 104B, 104C may also send control signals to each other, such as uplink maps, buffer status messages, requests for additional uplink communication resources, and instructions to adjust uplink data rates for particular CoSs. The base station 102 may have established point-to-point links with each of the user devices 104A, 104B, 104C. The data may be sent and received according to the Internet Protocol (IP), and may be encapsulated within Ethernet (IEEE 802.3) frames.

Each of the applications running on the user devices 104A, 104B, 104C and generating data may have its own quality of service (QoS) requirements, such as a minimum data rate and/or a maximum latency. The user devices 104A, 104B, 104C may each be configured with QoS policy data to identify the individual and concurrent application flows and/or service flows in uplink at the upper protocol layers (L3 and above) and map or group the applications into classes of service (CoSs), such as a first CoS and a second CoS, or any number of CoSs. The user devices 104A, 104B, 104C may group applications with similar QoS requirements into same classes of service. The user devices 104A, 104B, 104C may, for example, group applications with same or similar data rate and/or latency requirements into a same CoS. The CoS may have QoS requirements based on the best QoS requirement for the applications in each category, such as the highest data rate requirement of all the applications in the CoS and the lowest latency requirement of all the applications in the CoS, to ensure that all of the applications in the CoS meet their QoS requirements.

Each of the user devices 104A, 104B, 104C may perform data rate control for each identified application flow and/or service flow in uplink at the upper protocol layers and maintain a queue or buffer for storing the data packets while the data rate control function determines based on the QoS policy data when packets in each application and/or service flow should be put into the actual priority queues or transmission buffers. The priority queue or transmission buffer may store packets in the CoS that include data and are ready for uplink transmission over the radio link to the base station 102. The user devices 104A, 104B, 104C may determine which priority queues or buffers, such as the first priority queue or buffer or the second priority queue or buffer, from which to send packets to the base station 102. The user devices 104A, 104B, 104C may determine which priority queues or transmission buffers from which to send packets in each scheduled transmission block over the radio link based on their associated priority in an attempt to meet the QoS requirements of the applications in each CoS.

The user devices 104A, 104B, 104C may also adjust their data rate control functions for their identified application and/or service flows in uplink at the upper protocol layers based on a quality of service instruction for a flow control received from the base station 102. The quality of service instruction for a flow control may, for example, instruct the user device 104A, 104B, 104C to adjust an uplink data rate or transmission rate for a particular application and/or service flow, such as to increase a transmission rate of packets to meet the QoS requirements for one or more applications in that CoS, or decrease a transmission rate of packets for an application flow and/or service flow to enable packets in other CoSs to meet the QoS requirements for applications in those CoSs, or to throttle an application flow and/or service flow exceeding its maximum data rate in uplink.

The user devices 104A, 104B, 104C may each send at least one buffer signal to the base station 102. The user devices 104A, 104B, 104C may send the buffer signals to the base station 102 periodically in order to let the uplink radio scheduler in the base station 102 decide the required radio resources for each user device 104A, 104B, 104C. The buffer signals may each indicate a level of fullness of each or all of the transmission buffers or priority queues in the user device 104A, 104B, 104C that sent the buffer signal, or the buffer signals may each indicate a level of fullness of one of the buffers or queues in the user device 104A, 104B, 104C that send the buffer signal. The base station 102 may base the uplink radio scheduling at least in part on the received buffer signal(s).

The base station 102 may assign uplink data communication resources and/or uplink wireless resources to one or more of the user devices 104A, 104B, 104C. The base station 102 may also monitor whether the one or more user devices 104A, 104B, 104C are meeting the QoS requirements and/or QoS policies for the application, application type, CoS, service flow, and/or application flow in one, two, or more of their CoSs.

The base station 102 may monitor whether the one or more user devices 104A, 104B, 104C are meeting the QoS requirements for their CoSs and/or QoS policies based on the data received from the user devices 104A, 104B, 104C in the CoSs via the assigned uplink data communication resources, and/or based on the buffer signals received from the user devices 104A, 104B, 104C.

The base station 102 may determine whether the QoS requirements for application and/or service flows are being met based on packets that the base station 102 receives from the user devices 104A, 104B, 104C for forwarding to their next hop destination from the base station 102 e.g. to a User-Plane Gateway 106. The base station 102 may, for example, compare times of receipt of packets in a application and/or service flow to the QoS parameters in the policy data, determine a data rate for an application flow and/or service flow, or determine a latency for an application flow and/or service flow based on receiving packets in the application and/or service flow.

The base station 102 may also determine whether the user devices 104A, 104B, 104C will meet quality of service requirements for application flows and/or service flows for future transmissions based on the levels of fullness of the priority queues or transmission buffers for the CoSs. The base station 102 may, for example, determine that a transmission buffer or priority queue for a CoS, or multiple buffers or queues for multiple CoSs, are too full for the user device 104A, 104B, 104C to be able to meet QoS requirements of the CoS(s). The base station 102 may adjust the assigned uplink data communication resources, such as by assigning and/or scheduling additional uplink data communication resources and/or additional uplink wireless resources in the radio scheduler, and/or instruct the user device 104A, 104B, 104C to adjust an uplink data rate of a particular application and/or service flow or multiple application flows and/or service flows at the upper protocol layers, to meet the QoS of the CoS or CoSs.

The user device 104A, 104B, 104C may detect launching a new application flow in the user device with help of packet inspection in the base station. The user device may request QoS policy modification from the network in case the CoS requirements for a new application and/or service flow are not included in the existing policy data stored in the user device and in the base station. The network may verify from a subscription database whether the user device is authorized to get its new requested service.

By determining whether the QoS requirements in policy data for the application and/or service flows at the upper protocol layers are being met based on packets received from the user devices 104A, 104B, 104C and/or levels of fullness of the transmission buffers or priority queues for the radio link layer uplink scheduler, the base station 102 can determine whether the QoS requirements for the application flows and/or service flows are being met without the user devices 104A, 104B, 104C sending to the base station 102, and without the base station 102 receiving from the user devices 104A, 104B, 104C, any message indicating whether QoS requirements being met. The base station 102 and user devices 104A, 104B, 104C need not establish any radio bearers to communicate QoS performance related changes desired in the user devices.

The base station 102 may also send on demand an instruction to a user device 104A, 104B, 104C instructing the user device 104A, 104B, 104C to change a policy for a CoS. The base station 102 may instruct the user device 104A, 104B, 104C to change the policy including changing a minimum data rate and/or a maximum latency for the CoS, and/or may instruct the user device 104A, 104B, 104C to change the policy by adjusting packets sizes of packets in an application flow associated with an application, application type, and/or CoS. The base station 102 may instruct the user device 104A, 104B, 104C to change the policy based on the base station 102 determining that the user device 104A, 104B, 104C is not meeting QoS requirements for every application in the CoS, or based on determining that QoS requirements for the CoS are preventing the user device from meeting QoS requirements for other CoSs and/or applications in other CoSs.

Figure 2A:
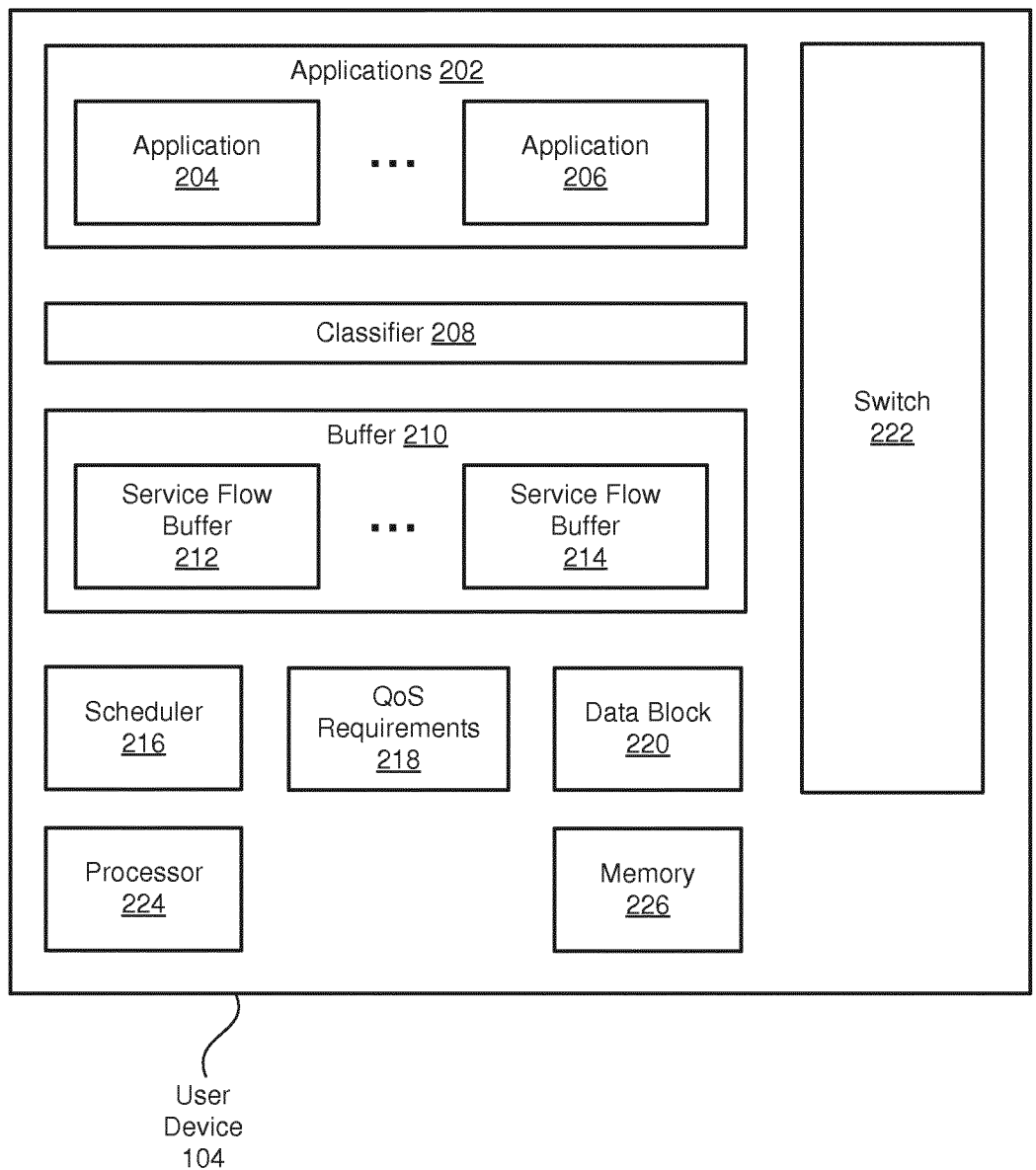
FIG. 2A is a diagram of a user device in the network according to an example embodiment.

FIG. 2A is a diagram of the user device 104 according to an example embodiment. The features of the user device 104 described herein may be applied to any of the user devices 104A, 104B, 104C described above.

The user device 104 may host and/or run multiple applications such as a first application 204 and a second application 206. The applications 204, 206 may include Voice over Internet Protocol (VoIP), an email client, a browser, a vidget, and/or a vehicle-to-vehicle (V2V) communication application (which may communicate with one of the stations 108A, 108B shown in FIG. 1), as non-limiting examples. The applications 204, 206 may be included in an application layer 202, and may each be associated with a Class of Service and a Traffic Class. Each application 204, 206 may have QoS requirements.

The user device 104 may also include a classifier 208. The classifier 208 may map the applications to buffers 212, 214 (described below) based on QoS requirements for the applications 204, 206. The classifier 208 may classify the applications 204, 206 into CoSs. The classifier 208 may classify applications 204, 206 into CoSs based on their QoS requirements, such as by classifying applications 204, 206 with similar QoS requirements into same CoSs. The classifier 208 may also classify uplink data packets generated by the applications 204, 206 into the CoSs associated with the applications 204, 206 that generated the respective packets.

The classifier 208 may also perform application and service aware policing in the user device 104. The classifier 208 may, for example, ensure that the user device 104 meets data rate and/or latency requirements of applications 204, 206 and/or service flows. The classifier 208 may also apply traffic flow template (TFT) filtering rules to data packets generated by the applications 204, 206, and may map service flows and applications 204, 206 to Virtual Local Area Networks (VLANs), CoSs, and associated buffers.

The classifier 208 may also perform data rate control. The classifier 208 may identify individual applications, application types, CoSs, application flows, and/or service flows associated with packets. The classifier 208 may inspect the packets against filtering rules, which may apply the TFT template, and which may be stored in the QoS requirements 218 (described below). The classifier 208 may detect that a packet belongs to an individual application and/or application type (such as an upper protocol layer), CoS, application flow, and/or service flow, the user device 104 may perform data rate control processing on the packet according to QoS requirements for the application, application type, CoS, packet flow, and/or service flow (which may be included in and/or stored in the QoS policy and/or policy data associated with the application, application type, CoS, packet flow, and/or service flow). The classifier 208 may determine the application, application type, CoS, service flow, and/or packet flow of the packet based on the inspecting, and store the packet in a service flow buffer 212, 214 (described below) associated with the determined application, application type, CoS, service flow, and/or packet flow based on the determination. The classifier 208 may also buffer and/or store the packet(s) before storing the packet in the appropriate service flow buffer 212, 214, delaying some packets with lower priority.

The user device 104 may also include a buffer 210. The buffer 210 may store uplink data packets generated by the applications 204, 206 before the user device 104 transmits the packets to the base station 102. The buffer 210 may be divided into multiple service flow buffers 212, 214. While two service flow buffers 212, 214 are shown in FIG. 2A, any number of service flow buffers 212, 214, such as four, corresponding to the number of CoSs that the classifier 208 maps the applications 204, 206 to, may be included in the buffer 210. The service flow buffers 212, 214 may each store packets for applications 204, 206 in service flows with similar QoS requirements and/or traffic types. The service flow buffers 212, 214 may be shared by groups of service flows with similar QoS requirements.

The service flow buffers 212, 214 in the buffer 210 may each be first-in first-out (FIFO), releasing packets in the order the packets were received. The service flow buffers 212, 214 from which packets are released may have different priorities, and some may receive preferential treatment, having their packets selected for transmission before others, depending on their respective QoS requirements and policies established by the user device 104 and modified by the base station 102. The buffer status report messages may indicate levels of fullness of the service flow buffers 212, 214.

The user device 104 may include a flow scheduler 216. The flow scheduler 216 may select a service flow buffer 212, 214 from which to transmit a packet to the base station 102. The flow scheduler 216 may select the service flow buffer 212, 214 based on policies maintained by the user device 104, which may be based on QoS requirements for the different CoSs and/or service flows, and one or more quality of service instruction signals received from the base station 102.

The user device 104 may store QoS requirements 218. The user device 104 may store the QoS requirements for each application 204, 206, and for each CoS and/or service flow into which the applications 204, 206 are mapped.

The user device may also store a data block 220. The data block 220 may include one or more, or multiple, packets ready for uplink transmission together to the base station 102. The data block 220 may include packets from a single service flow buffer 212, 214, or may include packets from multiple service flow buffers 212, 214.

The user device 104 may also include a switch 222. The switch 222, which is described further with respect to FIG. 2B, may receive packets from the applications hosted in the user device 104 and/or applications hosted in devices outside the user device such as the stations 108A, 108B using the user device 104 as a modem to provide mobile broadband access, and send packets to the base station 102.

The user device 104 may also include least one processor 224. The at least one processor 224 may execute instructions to perform any of the processes, methods, and/or functions described herein with respect to user devices 104.

The user device 104 may also include at least one memory device 226. The at least one memory device 226 may include at least one non-transitory computer-readable storage medium. The at least one memory device 226 may store data for transmission and/or data that is received, as well as information included with the data such as headers and/or trailers of packets and/or frames, such as the data included in the buffer 210 and/or data block 220. The at least one memory device 226 may include instructions stored thereon that, when executed by the at least one processor 224, are configured to cause the user device 104 to perform any of the processes, methods, and/or functions described herein with respect to user devices.

Figure 2B:
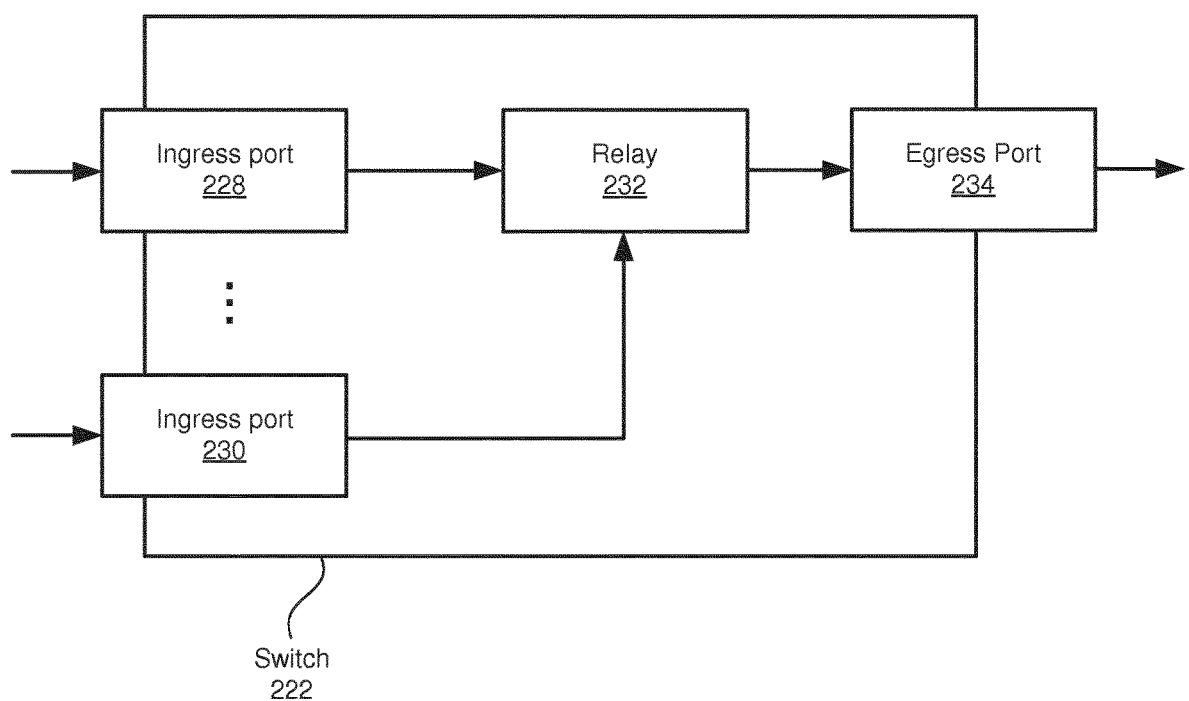
FIG. 2B is a diagram of a switch included in the user device according to an example embodiment.

FIG. 2B is a diagram of the switch 222 included in the user device 104 according to an example embodiment. The switch 222 may receive uplink packets from the other stations 108A, 108B in communication with the user device, and/or may receive packets from the applications 204, 206 running on the user device 104, store the packets, and send the packets to the base station 102.

In this example, the switch 222 may include one or more, or a plurality of, ingress ports 228, 230. The ingress ports 228, 230 may receive frames including packets. The ingress ports 228, 230 may perform filtering including dropping packets, tagging and untagging packets, VLAN identification (VID) translation, and encapsulation and de-encapsulation of packets.

The ingress ports 228, 230 may forward the packets and/or frames to a relay module 232. The switch 222 may include the relay module 232. The relay module 232 may forward packets to an egress port 234, filter the packets, and/or drop the packets.

The switch 222 may include the egress port 234. The egress port 234 may send packets to the base station 102. The egress port 234 may performing filtering (TFT) of packets, tagging and/or untagging packets, VID translation, encapsulation and/or de-encapsulation of packets and/or frames, metering of transmissions of packets, queuing of packets, and selection of packets for transmission. The egress port 234 may send packets within the data block 220 (shown in FIG. 2A) to the base station 102. The egress port 234 may send data blocks 220 to the base station 102 based on uplink data communication resources that the base station 102 granted to the user device 104.

In an example embodiment, the radio link layer scheduler in the base station 102 may grant uplink data communication resources to the user device 104 according to a token bucket scheme. The user device 104 may add tokens to the token bucket based on the base station assigning uplink data communication resources to the user device 104, and remove tokens from the token bucket based on sending packets or data blocks 220 from the egress port 234 and/or any of the service flow buffers 212 to the base station 102. If the user device 104 does not have any tokens in the user device's 104 token bucket, then the user device 104 may not send any packets and/or data blocks 220 to the base station 102.

The base station 102 may grant tokens to the user device 104, and/or the user device 104 may request tokens from the base station 102, periodically, such as every 250 µs. The base station 102 may grant a number of tokens to each user device 104 based on the determined uplink data communication needs of each user device 104, such as the QoS requirements of each CoS for which the user device 104 is sending packets.

Figure 3A:
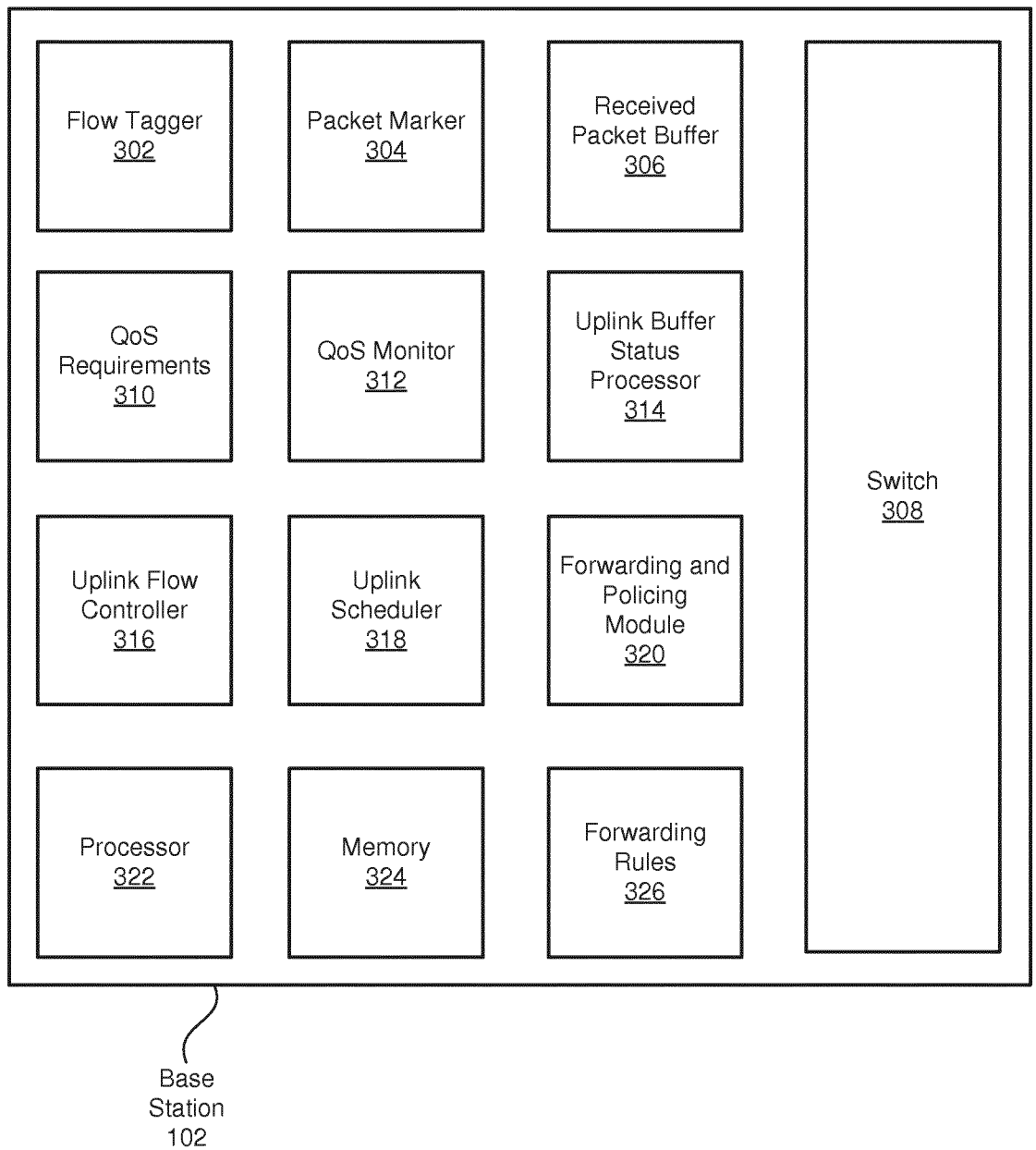
FIG. 3A is a diagram of a base station in the network according to an example embodiment.

FIG. 3A is a diagram of the base station 102 according to an example embodiment. Some, all, or additional modules may be included in the base station 102 according to example embodiments.

The base station 102 may include a flow tagger 302. The flow tagger 302 may tag frames, which may be Ethernet frames, within a same service flow to identify their VLAN and/or CoS. The VLAN tagged onto the frame may be used for routing and/or processing the frame, and the CoS tagged onto the frame may be used by the base station 102 to determine the CoS of the frame and included packet, from which the base station 102 may make determinations as to whether QoS requirements are being met.

The base station 102 may also include a packet marker 304. The packet marker 304 may mark packets according to their QoS. The packet marker may insert and/or mark the QoS in a Type of Service (ToS) field of a header in Internet Protocol version 4 (IPv4) packets, or may insert and/or mark the QoS in a Traffic Class field of a header in Internet Protocol version 6 (IPv6) packets. A switch 308 in the base station 102 may determine which packets to send, and/or prioritize the packets, based on the respective QoSs marked and/or inserted into the packets.

The base station 102 may include a received packet buffer 306. The received packet buffer 306 may store packets for classification and forwarding to their next hop destination that could be either the User-plane Gateway 106 or user devices 104.

The base station 102 may include a switch 308. The switch 308 may receive packets from the user devices 104 or the User-plane Gateway 106, store the packets in the received packets buffer 306 or another buffer or queue, and send the packets to the User-Plane Gateway 106 or user devices 104. The switch 308 will be described further with respect to FIG. 3B.

The base station 102 may store Quality of Service (QoS) requirements 310 and/or QoS policies. The QoS requirements 310 may include, for example, a minimum data rate and/or maximum latency for application, application type, CoS, service flow, and/or application flow.

The base station 102 may include a QoS monitor 312. The QoS monitor 312 may monitor and/or determine whether one user device 104, a first user device 104A, and a second user device 104B, or any number of user devices 104, are meeting QoS requirements and/or QoS policies for their respective application, application type, CoS, service flow, and/or application flow. The QoS monitor 312 may monitor and/or determine whether the user devices 104 are meeting QoS requirements for their applications and/or CoSs based on packets received from the user devices 104, such as based on times of receipt of the packets, determining a data rate based on a number of packets received or amount of data included in packets received for an application and/or CoS, and/or latency based on timestamps included in the packets. The QoS monitor 312 may also determine whether the user devices 104 will meet QoS requirements for future transmission of packets based on buffer lengths, queue lengths, and/or levels of fullness of buffers and/or queues for CoSs of the user devices 104.

The base station 102 may include an uplink buffer status processor 314 for handling the fast control loop in the uplink radio scheduler. The uplink buffer status processor 314 may determine whether the user devices 104 will meet QoS requirements for future uplink data transmissions based on based on buffer lengths, queue lengths, and/or levels of fullness of buffers and/or queues (such as the service flow buffers 212, 214 shown in FIG. 2A) for CoSs of the user devices 104. The uplink buffer status processor 314 may, for example, compare the lengths and/or levels of fullness of buffers and/or queues for CoSs of the user devices 104 to allowed uplink data rates and/or assigned uplink data communication resources to determine whether the user devices will be able to meet latency and/or data rate requirements. The uplink status processor 314 may determine the lengths and/or levels of fullness of buffers and/or queues for CoSs of the user devices 104 based on uplink buffer status reports received from the user devices 104. The uplink buffer status processor 314 may provide the determinations to the QoS monitor 312, according to an example embodiment.

The base station 102 may include an uplink flow controller 316 for adjusting dynamically the uplink data rate control function at upper application protocol layers in the user device 104. The uplink flow controller 316 may instruct the user devices 104 to change the priorities of an application flow and/or service flow 202 at the upper protocol layers given to their associated CoSs. The uplink flow controller 316 may instruct the user devices 104 to change the priorities of an application flow and/or service flow 202 at the upper protocol layers based on determinations of meeting or not meeting QoS requirements made by the QoS monitor. The uplink flow controller 316 may instruct the user device 104 to adjust, such as to increase or decrease, a rate of transmitting packets of an application and/or service flow 202 at the upper protocol layers from a CoS and/or service flow buffers 212, 214. The uplink flow controller 316 may, for example, instruct the user device 104 to increase or decrease, a rate of transmitting packets from a first application 204 and decrease a rate of transmitting packets from a second application 206 based on a determination by the QoS monitor that QoS requirements are being met by the second application 206 but not the first application 204, or based on a determination that transmissions from the first application 204 are more important than transmissions from the second application 206.

The flow controller 316 may monitor quality of an individual service flow (such as data transmitted within an individual application 204, 206) and determine whether QoS requirements are being met for a corresponding service flow, monitor quality of a service flow and determine whether a user device policy for the service flow is being met, monitor bit rates in the network 100 or over multiple CoSs of multiple user devices 104 and determine whether QoS requirements are being met, trigger adjustment of service flow handling such as increasing or decreasing the data rate of the service flows, trigger adjustment of data rates in the user devices 104 and/or base station 102, trigger adjustment of the uplink scheduling (such as the generation of an uplink map 422 shown in FIG. 4B), trigger adjustment of user device policy profiles used by the base station 102, and/or detect a poorly behaving user device 104 and suspend scheduling or assigning uplink data communication resources to the poorly behaving user device 104.

The base station 102 may include an uplink scheduler 318. The uplink scheduler 318 may schedule uplink transmissions by the user devices 104 to the base station 102. The uplink scheduler 318 may assign uplink data communication resources to the user devices 104 over the radio link such as time slots during which to transmit packets and/or frequency slots or bands via which to transmit packets. The uplink scheduler 318 may generate a map (such as an uplink map 422 shown in FIG. 4B) which specifies which user devices 104 will transmit data during which assigned time slots and/or frequency slots or bands. The switch 308 may send the map to the user devices 104, and the user devices 104 may receive and process the map, and send data during the assigned time slots and/or via the assigned frequency slots or bands.

The uplink scheduler 318 may assign the uplink data communication resources to the user devices 104 based on determined needs of each of the user devices 104. The uplink scheduler 318 may determine uplink data communication needs of each of the user devices 104 based at least in part on the QoS requirements 310 of each of the applications 204, 206 (not shown in FIG. 3A) running on the respective user device 104. The uplink scheduler 318 may also assign and/or determine uplink data communication needs of each of the user devices 104 based on determinations made by the QoS monitor 312. For example, if the QoS monitor 312 determines that a user device 104 is not meeting, and/or will not meet, the QoS requirements 310 of one or more applications 204, 206, then the uplink scheduler 318 may assign additional uplink data communication resources to the user device 104 that the QoS monitor 312 has determined is not meeting and/or will not meet the QoS requirements 310 of one or more applications 204, 206.

The base station 102 may also include a forwarding and policing module 320. A forwarding function of the forwarding and policing module 320 may identify service flows and/or VLAN IDs of data packets received from the user devices 104 and determine a next hop and/or egress port (shown in FIG. 3B) to which the packet should be sent. The forwarding function may forward the data packets based on forwarding rules 326 stored in the base station 102. A policing function of the forwarding and policing module 320 may drop packets under certain conditions such as the sending user device not behaving according to specified requirements, and/or monitor service flows against policy rules and instruct the sending user device 104 to adjust, such as increase or decrease, a data rate of a service flow.

The base station 102 may also include least one processor 322. The at least one processor 322 may execute instructions to perform any of the processes, methods, and/or functions described herein with respect to user devices.

The base station 102 may also include at least one memory device 324. The at least one memory device 324 may include at least one non-transitory computer-readable storage medium. The at least one memory device 324 may store data for transmission and/or that is received, as well as information included with the data such as headers and/or trailers of packets and/or frames, such as the data included in the received packet buffer 306. The at least one memory device 324 may include instructions stored thereon that, when executed by the at least one processor 322, are configured to cause the base station 102 to perform any of the processes, methods, and/or functions described herein with respect to the base station 102.

Figure 3B:
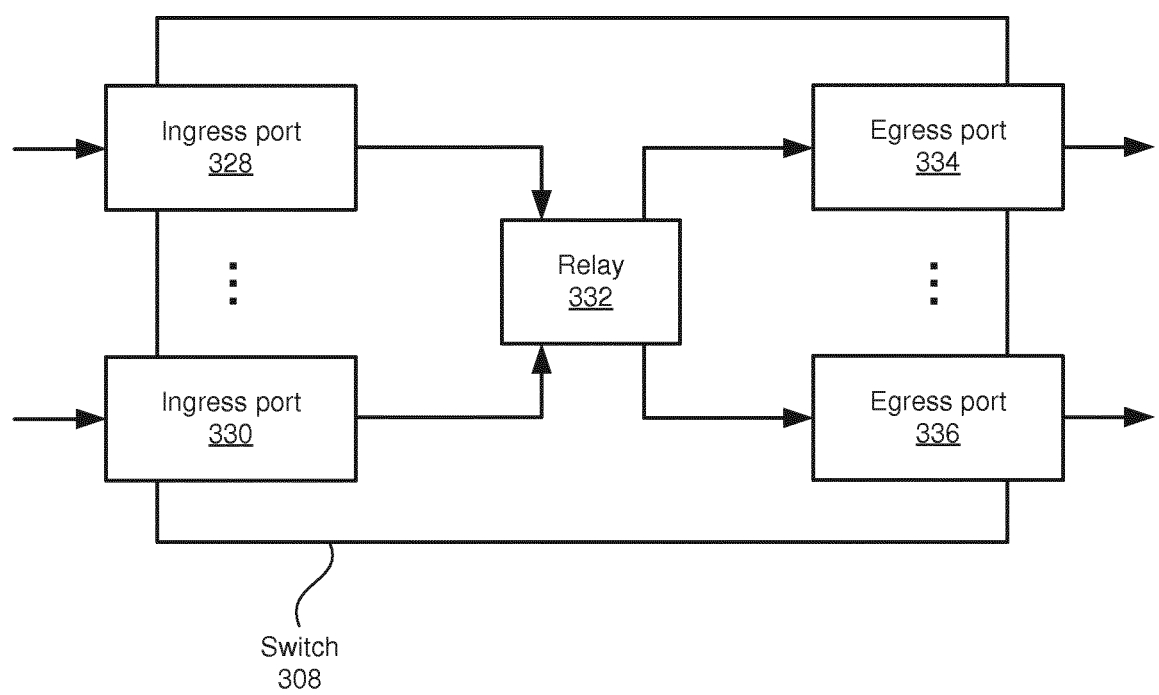
FIG. 3B is a diagram of a switch included in the base station according to an example embodiment.

FIG. 3B is a diagram of a switch 308 included in the base station 102 according to an example embodiment. The switch 308 may receive frames from one of the user devices 104 periodically, such as every 250 µs. The switch 308 may include one or more, or multiple, ingress ports 328, 330 via which the switch 308 may receive frames from the user devices 104. The ingress ports 328, 330 may filter and/or drop frames received from the user devices 104, tag or untag frames received from the user devices 104, translate VLAN IDs (VIDs) of frames received from the user devices 104, and/or encapsulate or decapsulate frames received from the user devices 104.

The switch 308 may include a relay 332. The relay 332 may forward frames from the ingress ports 328, 330 to ingress ports 334, 336, and/or may filter or drop frames.

The switch 308 may include one or more, or multiple, egress ports 334, 336. The egress ports 334, 336 may send frames received by the base station 102 from the user devices 104 to the User-plane Gateway 106 or other uplink node. In an example embodiment, each egress port 334, 336 may include its own scheduler and separate queues for frames. The egress ports 334, 336 may filter or drop frames, tag or untag frames, translate the VIDs of frames, encapsulate or decapsulate frames, meter a transmission or data rate of frames for each queue and/or CoS, queue frames for each queue and/or CoS, and select queues from which frames should be transmitted based on priorities of the queues and/or CoSs.

Figure 4A:
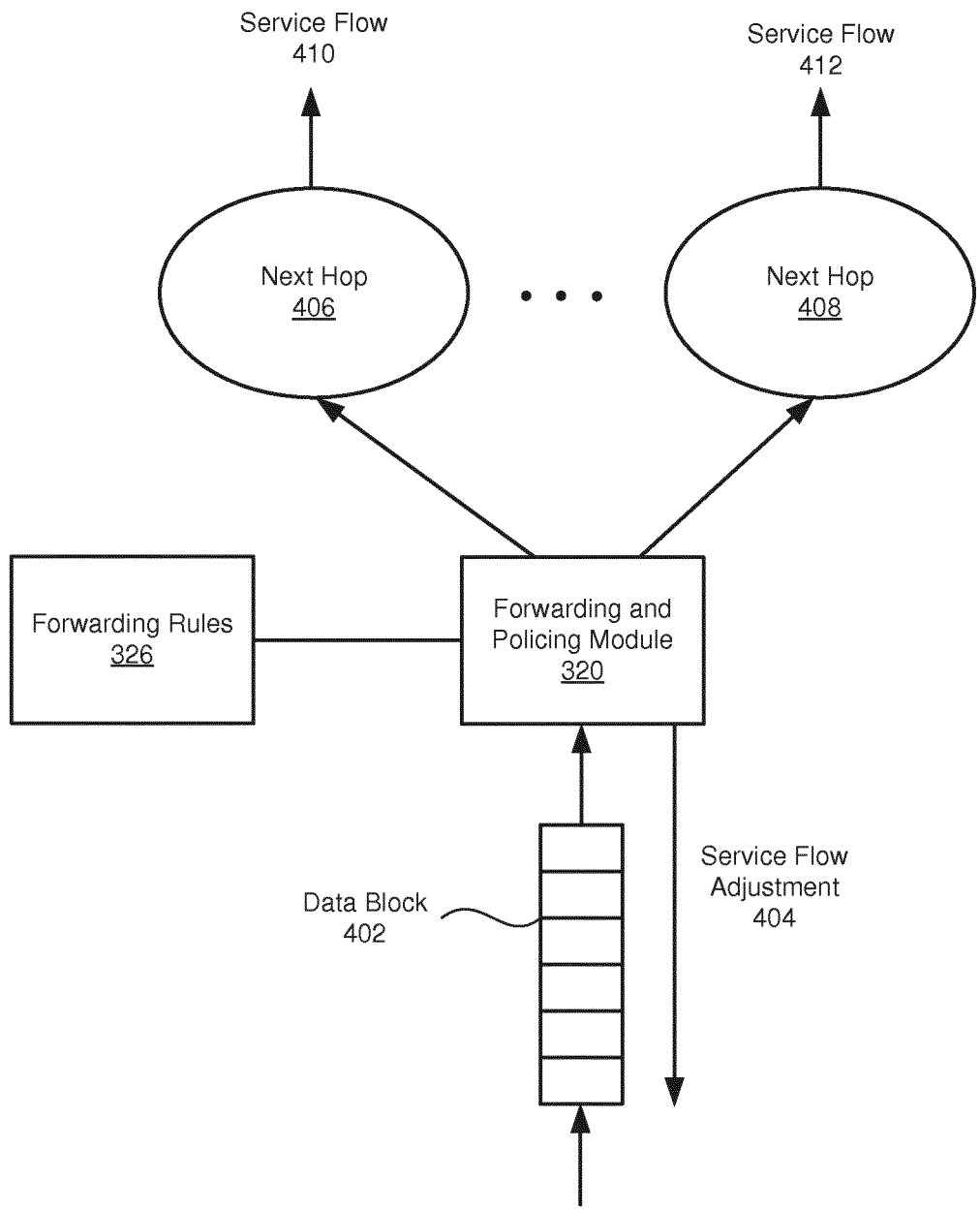
FIG. 4A is a diagram showing the base station forwarding data received from the user device according to an example embodiment.

FIG. 4A is a diagram showing the base station 102 forwarding data received from the user device 104 according to an example embodiment. The base station 102 may receive a data block 402 from the user device 104. The data block 402, which may include packets from multiple CoSs and/or may correspond to the data block 220 described with respect to FIG. 2A, may have been received from the user device 104 during a last and/or most recent transmission time interval (TTI). The data block 402 may include an address of a radio link identifier (RLID) over the point-to-point link between the base station 102 and the user device 104.

The forwarding and policing module 320 may apply rules to drop packets received from a user device 104 that is performing poorly and/or not meeting specified requirements, perform optional packet lookup for improved service awareness when a strict service segregation is not required, identify each service flow with a VLAN ID for the next hop treatment and forwarding decision, forward packets to the next hop 406, 408 according to the forwarding rules 326, and/or adjust the flow rate (404) of service flows by instructing the user device 104 to adjust an uplink data rate of an application and/or CoS.

The base station 102 may send packets from each service flow 410, 412, which may correspond to a CoS, to a next hop 406, 408. The next hop 406, 408 may be a next node in an uplink direction from the base station 102. The forwarding and policing module 320 may map each service flow 410, 412 to a next hop 406, 408 based on the forwarding rules 326. Multiple service flows 410, 412 may be mapped to a same next hop 406. The forwarding and policing module 320 may also tunnel and/or VLAN tag the service flows 410, 412 according to the forwarding rules 326, which may be specific to, and/or different for, each of the egress ports 334, 336. The forwarding and policing module 320 may, for example, mark an outer header of each packet traversing out of the base station 102 with a CoS and/or differentiated services code point (DSCP).

Figure 4B:
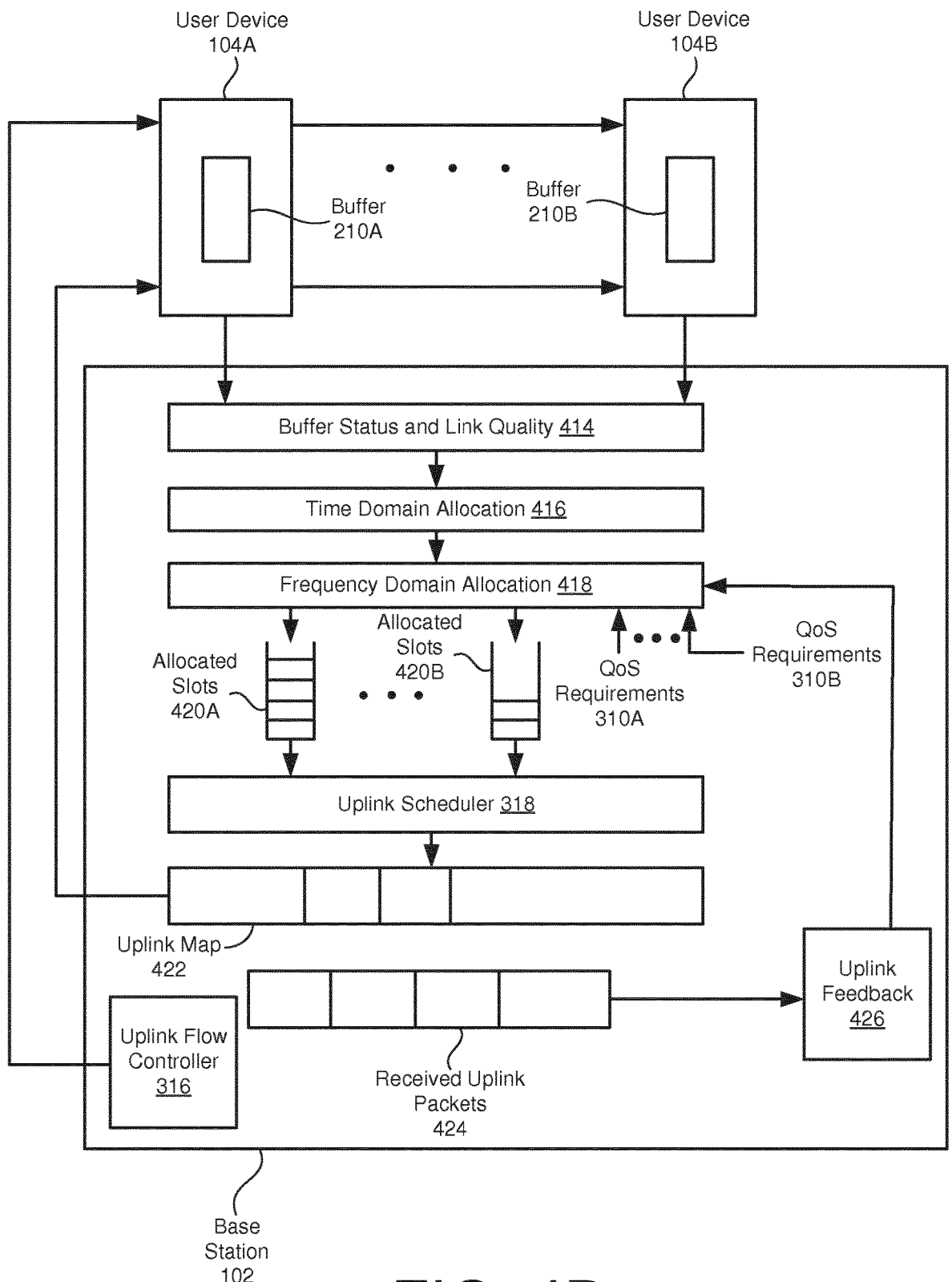
FIG. 4B is another diagram of the base station according to an example embodiment.

FIG. 4B is another diagram of the base station 102 according to an example embodiment. Multiple user devices 104A, 104B may each be in communication with the base station 102. Each user device 104A, 104B may maintain a buffer 210A, 210B. The buffer 210A, 210B maintained by each user device 104A, 104b may include multiple priority queues and/or service flow buffers 212, 214 (not shown in FIG. 4B).

The user devices 104A, 104B may each send the base station 102 buffer status and link quality messages 414. The user devices 104A, 104B may send messages to the base station 102 that indicate levels of fullness of their buffers and/or queues and report the quality of the link between the respective user device 104A, 104B and the base station 102 in a single buffer status and link quality message 414, or may send separate messages, a buffer status message indicating a level of fullness of the respective user devices' 104A, 104B buffers 210A, 210B and/or queues and a link quality message reporting the quality of the link between the respective user device 104A, 104B and the base station 102. The buffer status and link quality messages 414 may also include scheduling requests and reference signal transmissions.

The base station 102 may make a time domain allocation 416 to each of the user devices 104A, 104B. The time domain allocation 416 may allocate specific time slots during which each user device 104A, 104B may transmit packets in an uplink direction to the base station 102. In an example embodiment, if the number of user devices 104A, 104B served by the base station 102 is small and/or at or below a threshold, the base station 102 may omit the time domain allocation 416. The base station 102 may also omit the time domain allocation 416 for user devices 104A, 104B that are asleep.

The base station 102 may make a frequency domain allocation 418 to each of the user devices 104A, 104B. The frequency domain allocation 418 may allocate frequency slots to the user devices 104A, 104B according to fairness considerations and/or channel aware resource sharing considerations, QoS requirements 310A, 310B of each of the user devices 104A, 104B and/or the QoS requirements of the applications 204, 206 and/or CoSs of each of the user devices 104A, 104B, and the uplink feedback 426 based on uplink packets 424 (which may be included in the data block 220 and/or received packet buffer 306) received by the base station 102 from the user devices 104A, 104B.

The base station 102 may allocate frequency slots and/or time domain slots (allocated slots 420A, 420B) to each of the user devices 104A, 104B. The uplink scheduler 318 may generate an uplink map 422 with the allocated slots 420A, 420B. The base station 102 may send the uplink map 422 to the user devices 104A, 104B, and the user devices 104A, 104B may send uplink data packets to the base station 102 via the allocated slots 420A, 420B identified by the uplink map 422.

The base station 102 may allocate the frequency slots, which may at least in part determine the uplink data rate for the user devices, based on uplink feedback 426 generated based on the received uplink packets 424. The uplink feedback 426 may be based on determinations of whether the user devices 104A, 104B are or will meet QoS requirements, as determined by the QoS monitor 312 (shown in FIG. 3A).

The uplink flow controller 316 may instruct the first user device 104A and/or the second user device 104B to adjust an uplink data rate of a first application, application type, CoS, service flow, and/or application flow and/or a second application, application type, CoS, service flow, and/or application flow based on determinations of whether the user device 104A, 104B is meeting or will meet QoS requirements and/or a QoS policy for the first application, application type, CoS, service flow, and/or application flow and/or second application, application type, CoS, service flow, and/or application flow. The uplink flow controller may instruct the first user device 104A and/or the second user device 104B to adjust the uplink data rate of the first application, application type, CoS, service flow, and/or application flow and/or the second application, application type, CoS, service flow, and/or application flow to ensure that the first application, application type, CoS, service flow, and/or application flow and/or second application, application type, CoS, service flow, and/or application flow, or an application, application type, CoS, service flow, and/or application flow with a higher priority, meets CoS requirements and/or the CoS policy, according to example embodiments.

Figure 5:
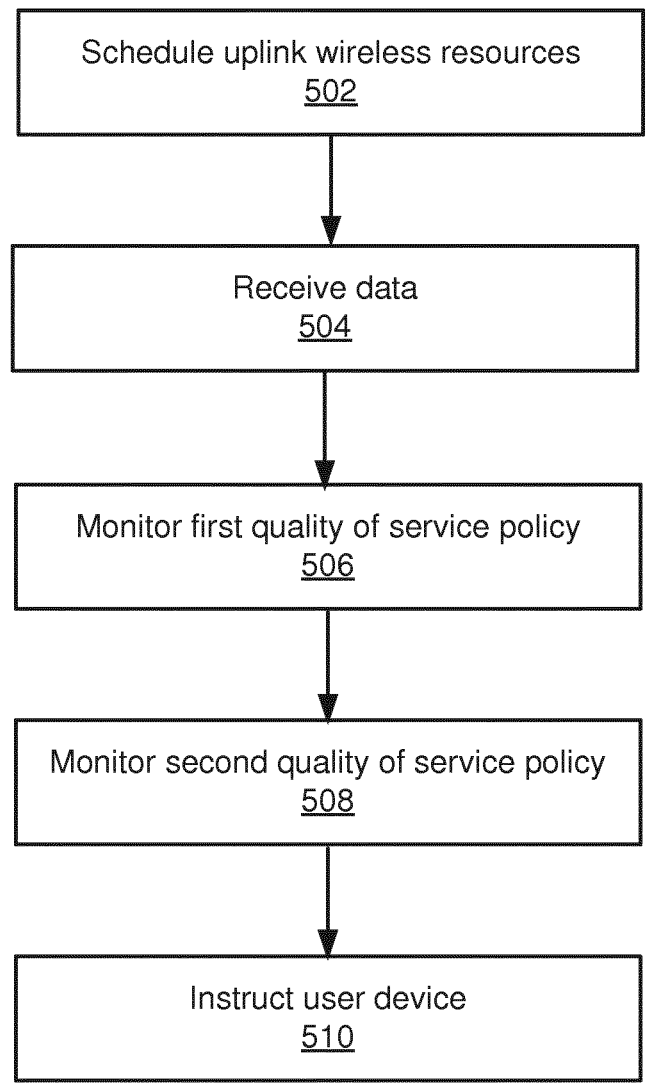
FIG. 5 is a flowchart showing a method performed by the base station according to an example embodiment.

FIG. 5 is a flowchart showing a method performed by the base station according to an example embodiment. According to this example, the method may include scheduling, by a base station, uplink wireless resources for a user device (502), receiving, from the user device via the scheduled wireless resources, data associated with at least a first application and a second application (504), monitoring whether the user device is meeting a first quality of service policy associated with the first application based on the received data associated with the first application (506), monitoring whether the user device is meeting a second quality of service policy associated with the second application based on the received data associated with the second application (508), and instructing the user device to adjust an uplink data rate of an application flow associated with the first application based on the monitoring whether the user device is meeting the quality of service policy for the first application (510).

According to an example embodiment, the first application may be included in a first application type, the second application may be included in a second application type, and the monitoring whether the user device is meeting the first quality of service policy may include monitoring whether the user device is meeting the first quality of service policy associated with the first application type based on received data associated with the first application and a third application included in the first application type.

According to an example embodiment, the first application may be included in a first class of service, the second application may be included in a second class of service; and the monitoring whether the user device is meeting the first quality of service policy may include monitoring whether the user device is meeting the first quality of service policy associated with the first class of service based on received data associated with the first application and a third application included in the first class of service.

According to an example embodiment, the monitoring whether the user device is meeting a first quality of service policy associated with the first application may include monitoring data received via a first application protocol layer flow. The method may further include determining whether received data is associated with the first application protocol layer based on a traffic flow template.

According to an example embodiment, instructing the user device to adjust the uplink data rate of the application flow may include instructing the user device to adjust the uplink data rate of the application flow at an upper application protocol layer associated with the first application based on the monitoring whether the user device is meeting the quality of service policy for the first application.

According to an example embodiment, the monitoring whether the user device is meeting quality of service requirements for the first application may be based on average packet sizes of the received data associated with the first application.

According to an example embodiment, the monitoring whether the user device is meeting quality of service requirements for the first application may be based on an average frequency of receiving packets associated with the first application.

According to an example embodiment, the monitoring whether the user device is meeting the quality of service policy for the first application may include comparing times of receipt of packets associated with the first application to quality of service requirements for the first application.

According to an example embodiment, the monitoring whether the user device is meeting the quality of service policy for the first application may include determining a data rate for the first application based on receiving packets associated with the first application.

According to an example embodiment, the monitoring whether the user device is meeting the quality of service policy for the first application may include determining a latency for the first application based on receiving packets associated with the first application.

According to an example embodiment, the monitoring whether the user device is meeting the quality of service policy for the first application may include determining a latency of service for the first application based on receiving packets associated with the first application.

According to an example embodiment, the monitoring whether the user device is meeting the quality of service policy for the first application may be performed without receiving, from the user device, any message indicating whether quality of service requirements are being met.

According to an example embodiment, the monitoring whether the user device is meeting the quality of service policy for the first application may be performed without establishing a radio bearer with the user device for the first application.

According to an example embodiment, the instructing the user device to adjust the uplink data rate may include instructing the user device to adjust packet sizes of packets in the application flow associated with the first application based on the monitoring whether the user device is meeting the quality of service policy for the first application.

According to an example embodiment, the uplink wireless resources may be included in a wireless point-to-point link between the base station and the user device.

According to an example embodiment, the method may further include determining whether the user device will meet the quality of service policy for future uplink data transmissions associated with the first application based on a level of fullness of a first queue associated with the first application, and instructing the user device to adjust an uplink data rate of the first application based on the level of fullness of the first queue.

According to an example embodiment, the method may further include receiving a message from the user device, the message indicating the level of fullness of the first queue.

According to an example embodiment, the method may further include determining whether the user device will meet the first quality of service policy for future uplink data transmissions associated with the first application based on a level of fullness of a first queue associated with the first application, and scheduling additional uplink wireless resources for the user device based on the level of fullness of the first queue.

According to an example embodiment, the method may further include receiving a message from the user device, the message indicating the level of fullness of the first queue.

According to an example embodiment, the method may further include determining whether the user device will meet the first quality of service policy for future uplink data transmissions associated with the first application based on a level of fullness of a first queue associated with the first application, and reducing the wireless resources scheduled for the user device based on the level of fullness of the first queue.

According to an example embodiment, the method may further include determining whether the user device will meet the first quality of service policy associated with the first application and the second quality of service policy associated with the second application based on a level of fullness of a first queue associated with the first application and a level of fullness of a second queue associated with the second application, and instructing the user device to adjust an uplink data rate of the first application and adjust an uplink data rate of the second application based on the level of fullness of the first queue and the level of fullness of the second queue.

According to an example embodiment, the method may further include assigning additional uplink wireless resources to the user device in response to determining that the user device has launched a new application, and instructing the user device to increase an uplink data rate of a class of service that includes the new application in response to determining that the user device has launched the new application.

According to an example embodiment, the method may further include forwarding data associated with the first application received from the user device, and determining whether a required data rate of the first application is being met by the user device. The instructing the user device may include instructing the user device to increase or decrease the uplink data rate of the first application based on the determining whether the required data rate of the application is being met by the user device.

According to an example embodiment, the method may further include assigning additional uplink wireless resources to the user device based on determining that the required data rate of the first application is not being met by the user device.

According to an example embodiment, the method may further include forwarding data associated with the first application received from the user device, and determining whether a required latency of the first application is being met by the user device. The instructing the user device may include instructing the user device to increase or decrease the uplink data rate of the first application based on the determining whether the required latency of the first application is being met by the user device.

According to an example embodiment, the method may further include instructing the user device to change the first quality of service policy.

According to an example embodiment, the first quality of service policy may include at least one of a minimum data rate and a maximum latency.

According to an example embodiment, the method may further include receiving data from the user device using the scheduled uplink wireless resources according to the Internet Protocol.

According to an example embodiment, the method may further include receiving data from the user device within Ethernet frames using the scheduled uplink wireless resources.

According to an example embodiment, the base station and the user device may be included in a fifth generation wireless mobile system (5G).

According to an example embodiment, the method may further include receiving data that the user device forwarded from multiple devices to the base station.

Figure 6:
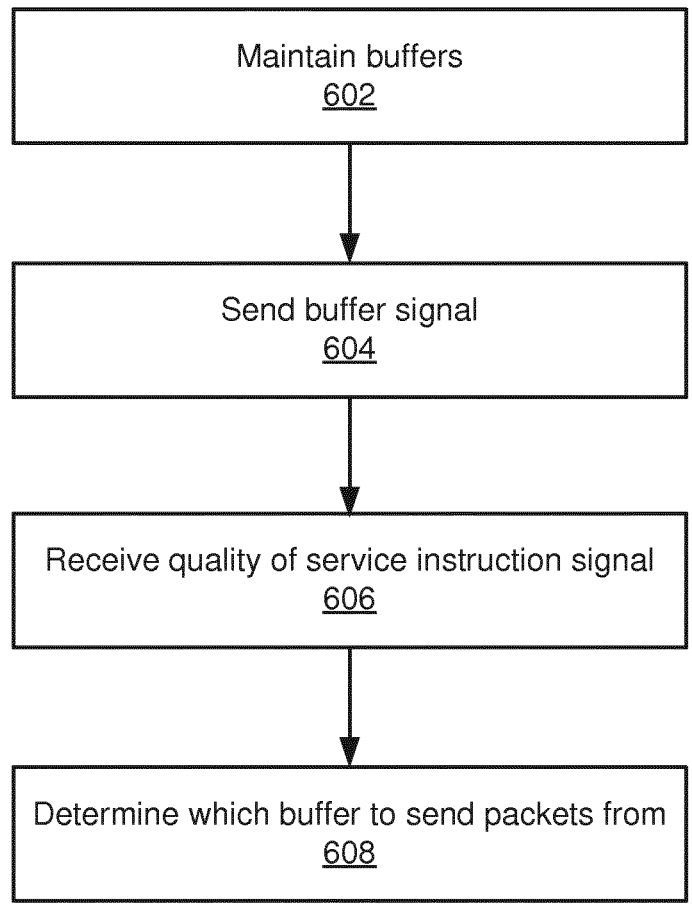
FIG. 6 is a flowchart showing a method performed by the user device according to an example embodiment.

FIG. 6 is a flowchart showing a method performed by the user device according to an example embodiment. The method may include maintaining, by a user device, at least a first buffer and a second buffer, the first buffer being shared by a first group of service flows with similar quality of service requirements and the second buffer being shared by a second group of service flows with similar quality of service requirements (602), sending at least one buffer signal to a base station, the at least one buffer signal indicating a level of fullness of the first buffer and a level of fullness of the second buffer (604), receiving a quality of service instruction signal from the base station, the quality of service instruction signal instructing the user device to adjust a data rate of the first group of service flows (606), and determining which of the first buffer and the second buffer from which to send packets to the base station based on quality of service requirements of the first group of service flows, the quality of service requirements of the second group of service flows, and the quality of service instruction signal from the base station (608).

According to an example embodiment, the method may further include mapping each of at least a first application, a second application, and a third application to either the first buffer or the second buffer based on quality of service requirements for each of the first application, the second application, and the third application.

According to an example embodiment, the method may further include maintaining a token bucket including adding tokens to the token bucket based on the base station assigning uplink wireless communication resources to the user device and removing tokens from the token bucket based on sending packets from either the first buffer or the second buffer to the base station.

According to an example embodiment, the method may further include maintaining a token bucket including adding tokens to the token bucket based on quality of service requirements for at least the first group of service flows and removing tokens from the token bucket based on sending packets from the first buffer to the base station.

According to an example embodiment, the method may further include maintaining a token bucket including adding tokens to the token bucket based on a guaranteed bit rate for at least the first group of service flows and removing tokens from the token bucket based on sending packets from the first buffer to the base station.

According to an example embodiment, the method is performed without sending any message to the base station indicating whether quality of service requirements are being met.

According to an example embodiment, the method is performed without establishing a radio bearer with the base station for either the first group of service flows or the second group of service flows.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
scheduling, by a base station, uplink wireless resources for a user device;
receiving, by the base station, from the user device via the scheduled wireless resources, data associated with at least a first application included in a first application type and a second application included in a second application type;
monitoring, by the base station, whether the user device is meeting a first quality of service policy associated with the first application based on the received data associated with the first application;
monitoring, by the base station, whether the user device is meeting a second quality of service policy associated with the second application based on the received data associated with the second application; and
instructing, by the base station, the user device to adjust an uplink data rate of an application flow associated with the first application based on whether the user device is meeting the first quality of service policy associated with the first application and the second quality of service policy associated with the second application.

2. The method according to claim 1, wherein
the monitoring whether the user device is meeting the first quality of service policy includes monitoring whether the user device is meeting the first quality of service policy associated with the first application type based on received data associated with the first application and a third application included in the first application type.

3. The method according to claim 1, wherein:
the first application is included in a first class of service;
the second application is included in a second class of service; and
the monitoring whether the user device is meeting the first quality of service policy includes monitoring whether the user device is meeting the first quality of service policy associated with the first class of service based on received data associated with the first application and a third application included in the first class of service.

4. The method according to claim 1, wherein the monitoring whether the user device is meeting a first quality of service policy associated with the first application includes monitoring data received via a first application protocol layer flow.

5. The method according to claim 1, wherein the instructing the user device to adjust the uplink data rate of the application flow includes instructing the user device to adjust the uplink data rate of the application flow at an upper application protocol layer associated with the first application or adjust packet sizes of packets in the application flow associated with the first application based on the monitoring whether the user device is meeting the quality of service policy for the first application.

6. The method according to claim 1, wherein the monitoring whether the user device is meeting quality of service requirements for the first application is based on at least one of:

average packet sizes of the received data associated with the first application, an average frequency of receiving packets associated with the first application, a comparison of times of receipt of packets associated with the first application to quality of service requirements for the first application, a data rate for the first application determined based on receipt of packets associated with the first application, a latency for the first application determined based on receipt of packets associated with the first application, and a latency of service for the first application determined based on receipt of packets associated with the first application.

7. The method according to claim 1, wherein the uplink wireless resources are included in a wireless point-to-point link between the base station and the user device.

8. The method according to claim 1, further comprising:
determining whether the user device will meet the quality of service policy for future uplink data transmissions associated with the first application based on a level of fullness of a first queue associated with the first application; and at least one of:
instructing the user device to adjust an uplink data rate of the first application; and
scheduling additional uplink wireless resources or reducing the wireless resources scheduled for the user device.

9. The method according to claim 1, further comprising:
determining whether the user device will meet the first quality of service policy associated with the first application and the second quality of service policy associated with the second application based on a level of fullness of a first queue associated with the first application and a level of fullness of a second queue associated with the second application; and
instructing the user device to adjust an uplink data rate of the first application and adjust an uplink data rate of the second application based on the level of fullness of the first queue and the level of fullness of the second queue.

10. The method according to claim 1, further comprising:
assigning additional uplink wireless resources to the user device in response to determining that the user device has launched a new application; and
instructing the user device to increase an uplink data rate of a class of service that includes the new application in response to determining that the user device has launched the new application.

11. The method according to claim 1, further comprising:
forwarding data associated with the first application received from the user device; and
determining whether a required data rate or a required latency of the first application is being met by the user device,
wherein the instructing the user device includes instructing the user device to increase or decrease the uplink data rate of the first application based on the determining whether the required data rate or the required latency of the application is being met by the user device.

12. The method according to claim 1, further comprising instructing the user device to change the first quality of service policy.

13. The method according to claim 1, further comprising at least one of:

receiving data from the user device using the scheduled uplink wireless resources according to an Internet Protocol; and receiving data from the user device within Ethernet frames using the scheduled uplink wireless resources.

14. The method according to claim 1, further comprising receiving data that the user device forwarded from multiple devices to the base station.

15. The method according to claim 4, further comprising determining whether received data is associated with the first application protocol layer based on a traffic flow template.

16. The method according to claim 8, further comprising receiving a message from the user device, the message indicating the level of fullness of the first queue.

17. An apparatus comprising:
at least one processor; and
at least one memory including computer program code the at least one memory and the computer program code configured to, with the at least one processor, cause the apparatus to perform at least the following:
schedule uplink wireless resources for a user device;
receive, from the user device via the scheduled wireless resources, data associated with at least a first application included in a first application type and a second application included in a second application type;
monitor whether the user device is meeting a first quality of service policy associated with the first application based on the received data associated with the first application;
monitor whether the user device is meeting a second quality of service policy associated with the second application based on the received data associated with the second application; and
instruct the user device to adjust an uplink data rate of an application flow associated with the first application based on whether the user device is meeting the first quality of service policy associated with the first application and the second quality of service policy associated with the second application.

18. A user device comprising:
at least one processor; and
at least one memory including computer program code the at least one memory and the computer program code configured to, with the at least one processor, cause the user device to perform at least the following:
maintain at least a first buffer and a second buffer, the first buffer being shared by a first group of service flows with similar quality of service requirements, the first group of service flows being associated with a first application, and the second buffer being shared by a second group of service flows with similar quality of service requirements, the second group of service flows being associated with a second application, the first application being included in a first application type, the second application being included in a second application type;
send at least one buffer signal to a base station, the at least one buffer signal indicating a level of fullness of the first buffer and a level of fullness of the second buffer;
receive a quality of service instruction signal from the base station, the quality of service instruction signal instructing the user device to adjust a data rate of the first group of service flows or the second group of service flows; and determine which of the first buffer and the second buffer from which to send packets to the base station based on quality of service requirements of the first group of service flows, the quality of service requirements of the second group of service flows, and the quality of service instruction signal from the base station.

19. The user device according to claim 18, wherein the at least one memory and the computer program code further configured to, with the at least one processor, cause the user device to perform at least the following:

map each of at least the first application, the second application, and a third application to either the first buffer or the second buffer based on quality of service requirements for each of the first application, the second application, and the third application.

20. The user device according to claim 18, wherein the at least one memory and the computer program code further configured to, with the at least one processor, cause the user device to perform at least the following:

maintain a token bucket including adding tokens to the token bucket based on the base station assigning uplink wireless communication resources to the user device and removing tokens from the token bucket based on sending packets from either the first buffer or the second buffer to the base station.

* * * * *